Sept. 8, 1925.

H. SCHNURPFEIL

POT FOR MELTING GLASS

Filed April 8, 1925

1,552,884

Inventor
H. Schnurpfeil,
By Marks Clerk
Attys.

Patented Sept. 8, 1925.

1,552,884

UNITED STATES PATENT OFFICE.

HANS SCHNURPFEIL, OF CARLSBAD, CZECHOSLOVAKIA.

POT FOR MELTING GLASS.

Application filed April 8, 1925. Serial No. 21,653.

*To all whom it may concern:*

Be it that I, HANS SCHNURPFEIL, a citizen of the Czechoslovakian Republic, and residing at Sprudelstrasse 40, Carlsbad, Czechoslovakia, have invented certain new and useful Improvements in Pots for Melting Glass, of which the following is a specification.

As crucibles or pots for the melting of glass vessels of a cylindrical or frusto-conical form have hitherto been employed, which stand with a flat bottom on the furnace bench (see Figure 1 of the drawing). This however gives rise to a disadvantage, in the melting process, that a substantially smaller heating effect is produced on the raw material of the glass located at the bottom of the crucible than on the raw glass material located in the upper part of the pot directly exposed to the temperature prevailing in the upper space of the furnace. The time occupied in melting is therefore excessively long and the consumption of fuel very great, in addition to which the life of such crucibles is comparatively short.

The object of this invention is to obviate these disadvantages; and the invention consists essentially in providing the bottom of the crucible with one or more hollow ribs projecting into the interior thereof and opening on the outside of the pot, so that the flames and combustion gases have unimpeded access to the interior of the ribs. Owing to this arrangement the bottom acquires a stepped form, which is advantageous both for a looser supporting of the raw material of the glass and for a better and more compact burning of the pot for the purpose of prolonging its life. More particularly, however, by this arrangement the result is obtained that the flames and combustion gases also exert a melting action on the raw glass material surrounding the ribs, so that the melting process is shortened, assuming that the other working conditions remain the same and consequently the expenditure of fuel is reduced.

In the accompanying drawings, Figure 1 shows, for purposes of comparison a flat-bottomed pot of the usual type, while the remaining figures illustrate one constructional form of a pot or crucible according to the invention.

Figure 1:
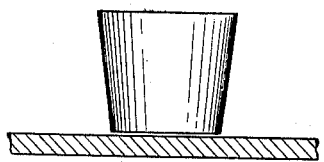
Figure 2:
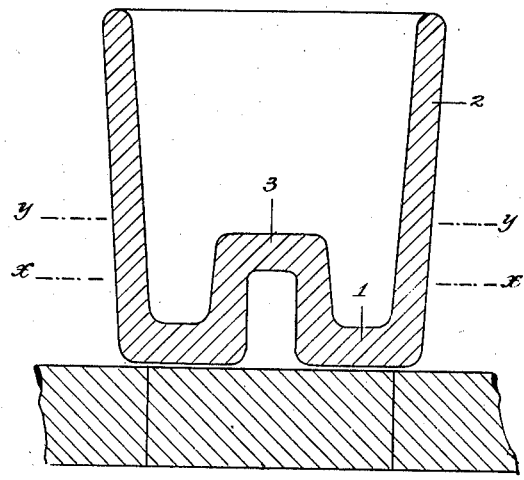
Figure 2 shows a sectional elevation thereof.
Figure 3:
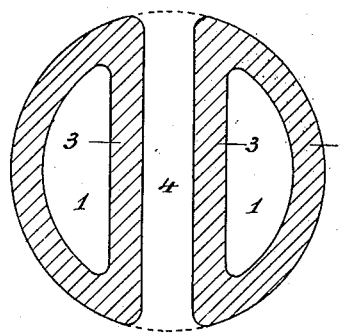
Figures 3 and 4 are sections on the line $x$—$x$ and $y$—$y$ respectively of Figure 2.
Figure 4:
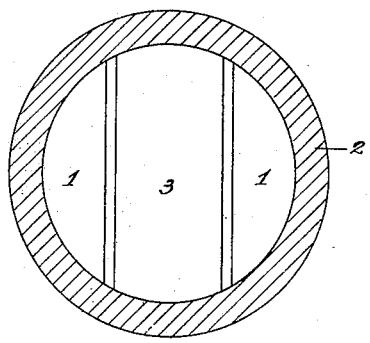

The bottom 1 of the pot 2 standing on the furnace bench is provided with a double walled rib 3 projecting into the interior of the furnace. The space 4 between the opposite walls of the rib is open to the exterior of the crucible, so that the flame gases can pass through it without hindrance and melt the raw material lying at the bottom.

What I claim is:—

1. A pot for melting glass, the bottom of said pot comprising a hollow rib projecting into the interior of the pot and opening to the exterior so that it can be freely traversed by flames and combustion gases.

2. A pot for melting glass, the bottom of said pot comprising hollow ribs projecting into the interior of said pot and opening to the exterior so that they can be freely traversed by flames and combustion gases.

In testimony whereof I have signed my name to this specification.

HANS SCHNURPFEIL.